March 26, 1929.　　　E. G. THOMAS　　　1,706,970
WEIGHING SCALE
Filed May 11, 1927
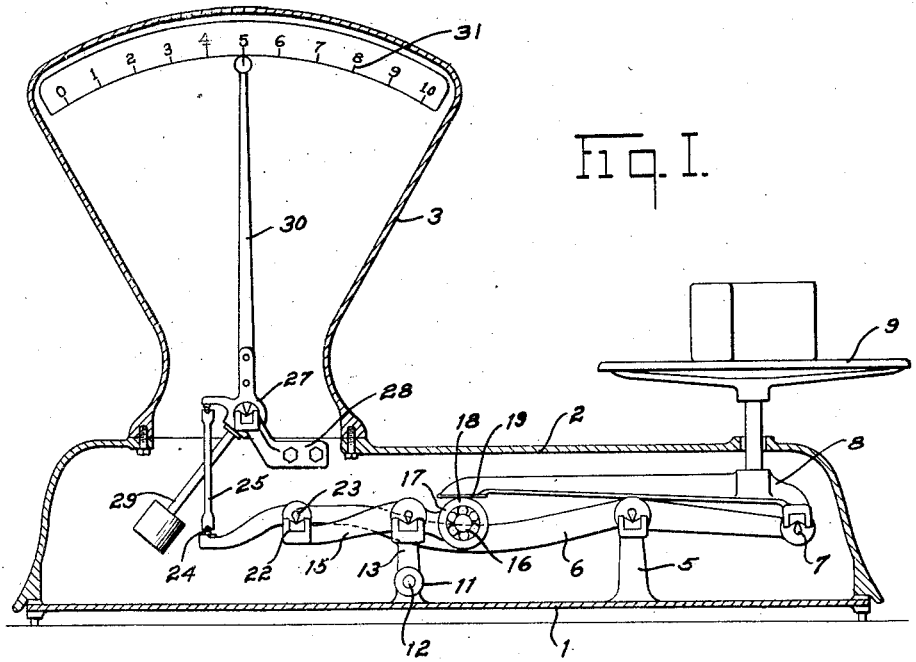
Fig. I.
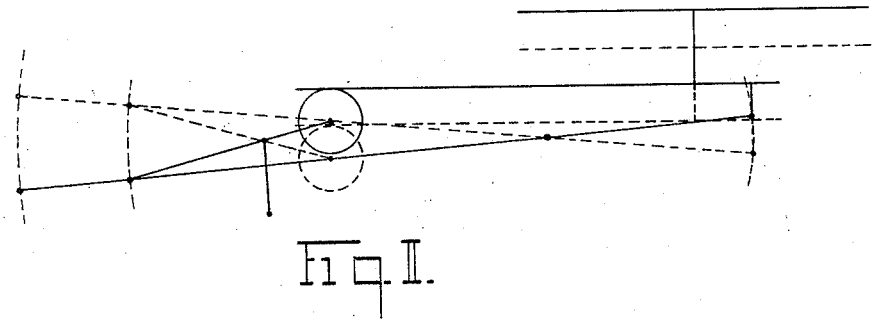
Fig. II.
Inventor
EDWARD G. THOMAS
By　*C. M. Marshall*
Attorney Patented Mar. 26, 1929.

1,706,970

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed May 11, 1927. Serial No. 190,388.

This invention relates to weighing scales, and one of its principal objects is the provision of weighing mechanism wherein the platform or commodity-receiver is prevented from tilting during weighing movements of the mechanism without the use of check links or other lateral thrust or pull members.

Another object of the invention is the provision of weighing mechanism having a commodity-receiver so supported that it is prevented from tilting without the use of additional links, the parts being so arranged that all the forces set up by the weight of the load and the weight of the parts of the weighing mechanism act substantially vertically.

Another object of the invention is the provision of a weighing device in which the commodity may be supported upon two levers without necessitating the use of compensating links.

Still a further object of the invention is the provision of a weighing mechanism having a commodity-receiver supported upon two levers, the construction being simple, inexpensive, and embodying a minimum number of parts.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a vertical sectional view through a scale of the so-called fan type embodying my invention;

Figure II is a diagrammatic view showing different positions assumed by the levers and associated parts in certain weighing positions.

Referring to the drawings in detail, the lever mechanism of the scale is supported upon a base plate 1 and is adapted to be enclosed within a base housing 2, the indicating mechanism being housed and supported within a fan-shaped casing 3 erected upon one end of the base housing 2. A side elevational view only of the scale is shown, but it is to be understood that the levers and associated mechanism are of the conventional type having pairs of load and fulcrum pivots and the like. The base plate 1 is formed with integral upwardly projecting stands 5, the upper ends thereof pivotally supporting a lever 6.

One end of the lever 6 is provided with knife edge pivots 7 pivotally engaging a depending arm of a spider 8, the latter suitably supporting a commodity-receiver or platter 9. The base plate 1 is provided with a boss 11 having a transverse bore adapted to receive a pin 12, the latter serving as a pivotal support for a member 13, the upper end of the member 13 pivotally supporting a lever 15. One end of the lever 15 is formed with a transversely projecting tenon or stub shaft 16 which forms the inner raceway for a plurality of bearing balls 17 surrounded by an annular race 18. The periphery of the ball race 18 engages the horizontal surface of a pad 19 forming a part of the spider 8 and thus serves to support the other end of the spider. This type of construction provides a suitable "lost motion" connection between the parts so that the use of compensating links is avoided. The opposite end of the lever 15 is provided with a V-shaped bearing 22 which engages a pivot 23 carried by the lever 6, the nose end of the lever 6 being equipped with a cone pivot 24 engaging a conical socket in the lower end of a compression link 25, the upper end similarly engaging a pivot secured to the load-counterbalancing means. The counterbalancing and indicating mechanism comprises a center structure 27 suitably pivoted upon a bracket 28 secured to the base of the scale, a pendulum 29 and an upwardly extending indicating hand 30 co-operating with a suitably graduated chart 31 fixed in the upper part of the fan-shaped housing 3.

In the operation of the scale the weight of a load placed upon the commodity-receiver 9 is transmitted through the medium of the levers 6 and 15 to the "push" connection 25, causing the pendulum 29 to swing outwardly to a position of balance, the indicator simultaneously moving to a position with respect to the chart 31 to properly indicate the weight of the load. If the center of mass of the load to be weighed is placed on the commodity-receiver in a vertical plane passing through the edges of the pivots 7, it will be apparent that the weight of the load will be entirely transmitted to the pendulum through the lever 6. Should the center of mass of the load on the commodity-receiver be moved to the left of a vertical plane passing through the edges of the pivots 7, a portion of the weight of the load will be transmitted to the ball race 18, thence through the lever 15 to the lever 6 by means of the pivotal connection 23. In this manner the entire weight of a load is offset by the load-counterbalancing mechanism irrespective of the position of the load upon the commodity-receiver. It will be apparent from examination of the diagram shown in Figure II that the extremities of the platform spider 8 move through equal distances during weighing operations, as the lengths of the long and short arms of the lever 6 are respectively proportional to the arms of the lever 15.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism comprising a platform lever, a commodity-receiver, connections between said lever and said commodity-receiver, said connections including a revoluble member whereby relative motion may be had between the lever and commodity-receiver.

2. In a device of the class described, in combination, weighing mechanism comprising lever and load-counterbalancing mechanisms, a commodity-receiver, and connections between said commodity-receiver and said levers, one of said connections comprising an anti-friction revoluble element interposed between said lever and said commodity-receiver.

3. In a device of the class described, in combination, weighing mechanism comprising a base, a compression member pivotally secured to said base, a lever fulcrumed upon said compression member, means for preventing said lever from moving out of operative position, a commodity-receiver, and connections between said lever and said commodity-receiver.

4. In a device of the class described, in combination, weighing mechanism comprising a base, a lever fixedly fulcrumed upon said base, a compression member pivotally secured to said base, a lever fulcrumed upon said compression member, a commodity-receiver, and connections between said commodity-receiver and said levers.

5. In a device of the class described, in combination, weighing mechanism comprising a plurality of levers, load-counterbalancing mechanism connected to one of said levers, one of said levers being supported upon a movable member, a commodity-receiver, and means comprising a revoluble member for connecting said commodity-receiver to one of said levers.

6. In a device of the class described, in combination, weighing mechanism comprising a plurality of levers, load-counterbalancing mechanism connected to one of said levers, one of said levers being supported upon a movable member, a commodity-receiver, means comprising a revoluble member for connecting said commodity-receiver to one of said levers, and a pivotal connection between the other of said levers and said commodity-receiver.

7. In a device of the class described, in combination, weighing mechanism comprising lever and load-counterbalancing mechanism, a commodity-receiver, and connections including an anti-friction revoluble member interposed between the commodity-receiver and said lever mechanism.

8. In a device of the class described, weighing mechanism, including a lever, load-counterbalancing mechanism connected to said lever, an anti-friction revoluble member carried by said lever, a commodity-receiver, and connections between said revoluble member and the commodity-receiver.

9. In a device of the class described, in combination, lever mechanism, load-counterbalancing mechanism, a push connection between said lever and load-counterbalancing mechanisms, a commodity-receiver, and connections between said lever mechanism and the commodity-receiver including a lost motion connection.

EDWARD G. THOMAS.